3,405,095
POLYMERIZATION OF UNSATURATED ALDEHYDES USING METALLIC SILVER AS REDUCING AGENT IN A REDOX CATALYST

Heinz Hartel, Oberlar, and Hans Mirau, Hennef (Sieg), Germany, assignors to Dynamit Nobel Aktiengesellschaft, Troisdorf, Bezirk Cologne, Germany
No Drawing. Filed Dec. 23, 1966, Ser. No. 604,150
Claims priority, application Germany, Dec. 24, 1965, D 49,019
6 Claims. (Cl. 260—67)

ABSTRACT OF THE DISCLOSURE

Polymerization of lower unsaturated aldehydes using a redox catalyst system in the presence of metallic silver as the reducing agent.

---

This invention relates to the production of addition polymers having pendant aldehyde groups. It more particularly refers to improvements in this process whereby the recovery of catalyst values from the product is facilitated.

This specification discloses improvements in the process of polymerizing unsaturated aldehydes with a redox system catalyst. The improvement comprises using metallic silver as the reducing agent.

It is known in the art to polymerize acrolein, methacrolein and other similar unsaturated aldehydes in an aqueous medium in the presence of a redox system catalyst. There have been reported that such oxidizing agents as persulfates, peroxides and hydroperoxides and such reducing agents as silver nitrate are useful in this polymerization process to form linear, relatively high molecular weight products having free aldehyde groups therein. (See for example Houben-Weyl, "Methoden der Organischen Chemie," 4th ed. (1961), vol. XIV/1, "Makromolekulare Stoffe," pp. 1083 and 1084.

Aldehyde containing polymers, such as those made as described above, are often useful as intermediates for the preparation of polymers having free carboxyl groups, e.g., acrolein can be polymerized and then oxidized to polyacrylic acid, or for the preparation of addition polymers having other pendant moieties, e.g., products of Aldol condensation, Cannizzaro reaction, etc.

It is often desirable to separate the polymerization catalyst from the polymer product. Since silver nitrate is substantially soluble in aqueous systems, the separation of such catalyst from the polymer product is often difficult.

It is therefore an object of this invention to provide a novel process for the production of polyaldehydes.

It is another object of this invention to provide a novel catalyst for the production of polyaldehydes.

Other and additional objects of this invention will become apparent from a consideration of this entire specification including the claims appended hereto.

In accord with and fulfilling these objects, one aspect of this invention resides in the use of a redox catalyst wherein the reducing portion thereof is solid, metallic silver for the polymerization of unsaturated aldehydes to addition polymers having free pendant aldehyde groups. It is preferred in the practice of this invention that the silver reducing agent have as high a surface area as possible. Toward this end, it is particularly preferred that the solid silver catalyst be used in powder or sponge form. By proceeding in this manner, it has been found to be readily possible to separate polymer product from catalyst by the simple unit operation of filtration. With the exception of the use of solid silver as the catalyst reducing agent, this polymerization is carried out in exactly the same manner as is known in the art.

The polymerization product of this invention may have a molecular weight of about 45,000 and is useful in its as-made condition, that is as an aqueous suspension, for conversion to other desirable polymers by oxidation, Aldol condensation, Cannizzaro reaction, etc., according to known techniques for carrying out these processes, especially oxidation to polycarboxylic acid according to the process described in application Ser. No. D48,981, filed Dec. 22, 1965, in Germany.

The silver that is filtered out of the polymerization product of this invention is suitable as such for reuse in further polymerization of unsaturated aldehydes. The aldehyde monomers particularly well suited to use in this invention include acrolein and methacrolein each alone or in admixture with each other to form a copolymer.

The following examples illustrate the practice of this invention without being limiting thereon.

EXAMPLE 1

While introducing nitrogen, 4.55 g. of $K_2S_2O_8$ were dissolved in 250 ml. of distilled water; 55 ml. of distilled acrolein were added, and then 1.27 g. of silver powder (manufactured from silver oxide by reduction) were added to the solution. After a few minutes the precipitation of a white polymer began. Nitrogen was bubbled through for another hour, and then 35 g. of NaCH in 900 ml. of water was added. The mixture was heated to 50–60° C., and oxygen was bubbled through for 4 hours. Then the catalyst was removed and the polycarboxylic acid was precipitated by means of dilute nitric acid. The carboxyl group content amounted to 37.9% of the theory (calculated as polyacrylic acid).

Repetition of the process with the recovered silver led to similar results.

EXAMPLE 2

The procedure was the same as in Example 1, but the silver-containing polyacrolein was filtered and subjected to a Cannizzaro reaction in the manner described by R. C. Schulz, J. Kovacs and W. Kern in "Makromoleflulare Chemie," 67 (1963), p. 194, with the exception that the dialysis and freeze drying were omitted, and, after the disproportioning was completed, the silver was removed by filtration, the mixture was adjusted to pH 7 and concentrated and then diluted with a 1:1 mixture of methanol and ether. In this manner, the polyhydroxycarboxylic acid was obtained as a sodium salt with about 70% of the theoretically computed carboxyl groups. The recovered silver was successfully reused for the acrolein polymerization.

What is claimed is:

1. In the process of polymerizing lower unsaturated aldehydes into addition polymers having pendant free aldehyde groups in an aqueous polymerization medium and in the presence of a redox catalyst system; the improvement which comprises utilizing as the reducing agent of said redox catalyst solid, metallic silver.

2. The improved process claimed in claim 1 wherein said silver is powdered.

3. The improved process claimed in claim 1 wherein said aldehyde is at least one selected from the group consisting of acrolein and methacrolein.

4. The improved process claimed in claim 1 wherein said polyaldehyde product is oxidized to a polycarboxylic acid polymer product and wherein said metallic silver is recovered from said acid polymer product by filtration and recycled for use in catalyzing aldehyde polymerization.

5. The improved process claimed in claim 1 wherein said polyaldehyde product is subjected to Aldol condensation and said silver is recovered from the Aldol product by filtration and recycled for use in catalyzing aldehyde polymerization.

6. The improved process claimed in claim 1 wherein said polyaldehyde product is subjected to a Cannizzaro reaction and said silver is recovered from said reaction product by filtration and recycled for use in catalyzing aldehyde polymerization.

References Cited

UNITED STATES PATENTS 3,127,374  5/1964  Kern et al.

FOREIGN PATENTS 6,500,505  7/1965  Netherlands.

WILLIAM H. SHORT, *Primary Examiner.*

L. M. PHYNES, *Assistant Examiner.*